US008989702B2

(12) United States Patent
Cho et al.

(10) Patent No.: US 8,989,702 B2
(45) Date of Patent: Mar. 24, 2015

(54) DEVICE AND METHOD FOR CONTROLLING CHARGING IN A MOBILE COMMUNICATION SYSTEM

(75) Inventors: Song Yean Cho, Seoul (KR); Ji Cheol Lee, Suwon-si (KR); Sung Ho Choi, Suwon-si (KR); Joon Ho Park, Seongnam-si (KR); Kill Yeon Kim, Suwon-si (KR); Ki Suk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 13/981,474

(22) PCT Filed: Jan. 30, 2012

(86) PCT No.: PCT/KR2012/000696
§ 371 (c)(1),
(2), (4) Date: Jul. 24, 2013

(87) PCT Pub. No.: WO2012/102594
PCT Pub. Date: Aug. 2, 2012

(65) Prior Publication Data
US 2013/0316674 A1 Nov. 28, 2013

(30) Foreign Application Priority Data
Jan. 28, 2011 (KR) .................. 10-2011-0009062

(51) Int. Cl.
H04M 11/00 (2006.01)
H04M 15/00 (2006.01)
H04L 12/14 (2006.01)
H04M 15/06 (2006.01)

(52) U.S. Cl.
CPC ....... H04M 15/8083 (2013.01); H04L 12/1475 (2013.01); H04M 15/51 (2013.01); H04L 12/1435 (2013.01); H04L 12/146 (2013.01); H04M 15/06 (2013.01); H04M 15/07 (2013.01); H04M 15/52 (2013.01); H04M 15/73 (2013.01); H04M 2215/0192 (2013.01)
USPC ........................ 455/406; 705/14.1; 705/14.45

(58) Field of Classification Search
USPC .............. 455/403, 405–408; 705/14.1, 14.45, 705/14.4
See application file for complete search history.

(56) References Cited

U.S. PATENT DOCUMENTS

2004/0125755 A1* 7/2004 Roberts ........................ 370/259
2009/0061884 A1 3/2009 Rajan et al.
(Continued)

FOREIGN PATENT DOCUMENTS

KR 10-2001-0021058 A 3/2001
KR 10-2001-0113291 A 12/2001

*Primary Examiner* — Ajit Patel
(74) *Attorney, Agent, or Firm* — Jefferson IP Law, LLP

(57) ABSTRACT

The present invention relates to a method and device for controlling charging in a mobile communication system. The method for controlling charging in a mobile communication system is characterized by comprising the steps of: generating, by a service provider, a sponsor coupon to transmit to a terminal when a sponsor service request transmitted from the terminal is received; receiving, by the terminal, the sponsor coupon to transmit to an operator; setting, by the operator, a filtering and charging rule for sponsor traffic by using the sponsor coupon, and notifying the terminal; requesting, by the terminal, the sponsor service to the service provider again, and receiving a sponsor traffic service from the service provider; and charging, by the operator, the service provider for the sponsor traffic.

11 Claims, 16 Drawing Sheets

(56) References Cited

U.S. PATENT DOCUMENTS

2009/0209233 A1* 8/2009 Morrison ................. 455/411
2010/0190469 A1* 7/2010 Vanderveen et al. ......... 455/406
2011/0238476 A1* 9/2011 Carr et al. ................. 705/14.25

* cited by examiner

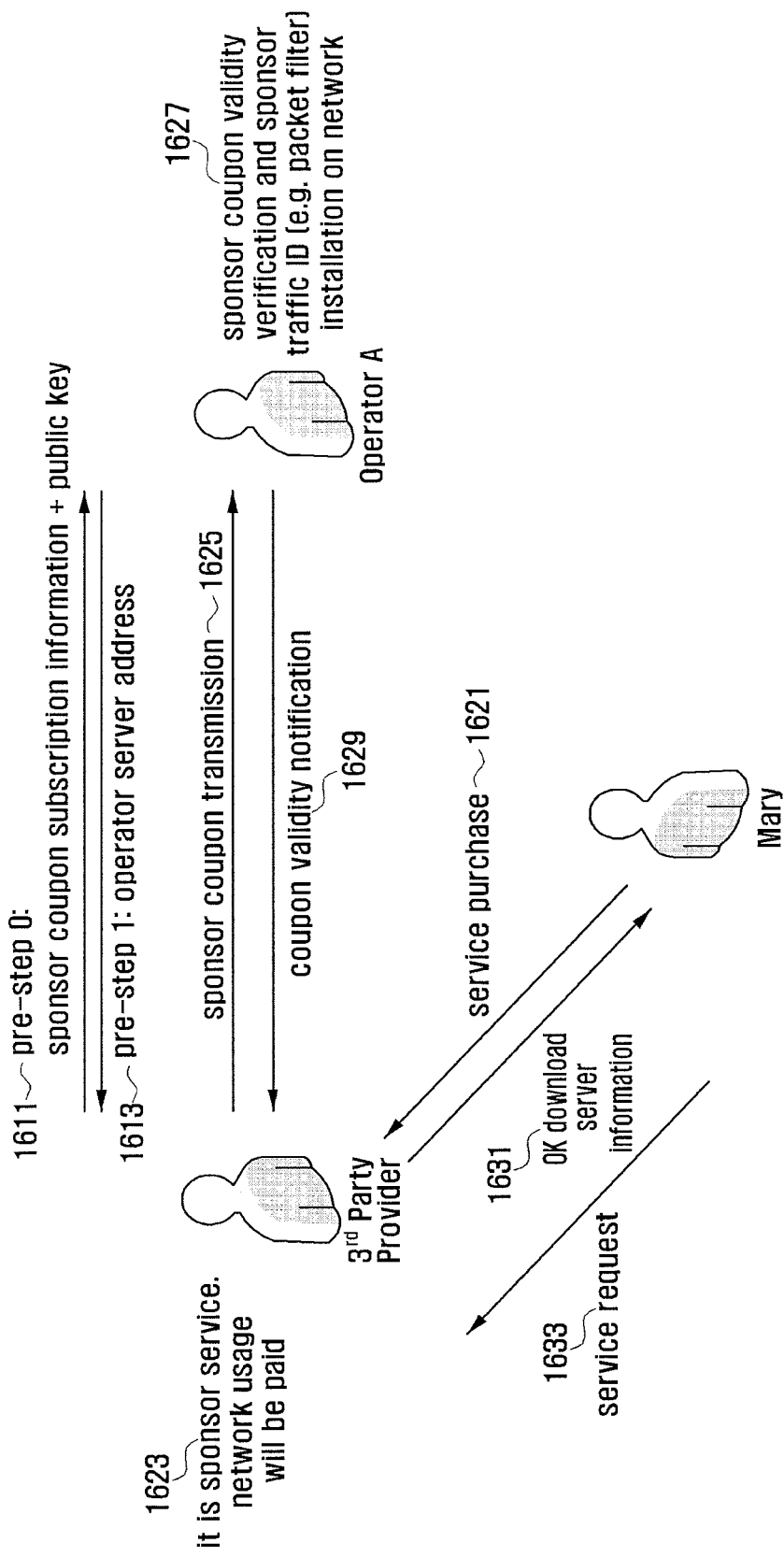

DEVICE AND METHOD FOR CONTROLLING CHARGING IN A MOBILE COMMUNICATION SYSTEM

BACKGROUND OF THE INVENTION

1. Field of the Invention

The present invention relates to a billing control apparatus and method of a mobile communication system and, in particular, a billing control apparatus and method of charging for sponsor traffic in the mobile communication system.

2. Description of the Related Art

With the advance of network technologies, various types of electronic purchase transactions occur. Typically, the electronic purchase transaction is conducted in such a way that a user accesses a service provider via a communication network and buys products while viewing their information. In this case, the user may pay for the network access. For example, if the user accesses the service provider's server to purchase products, the mobile communication network operator charges the user for the network access. Particularly, it takes relatively long time to purchase the contents having a large volume of data such as electronic book and audio, resulting in increase of network utilization cost.

DISCLOSURE OF INVENTION

Technical Problem

The present invention relates to a method for billing the service provider for traffic between the user and the service provider in the communication network including the service provider, network operator, and terminals.

Solution to Problem

In accordance with an embodiment of the present invention, a billing control method of a mobile communication system includes issuing, at a service provider when a sponsor service request is received from a terminal, a sponsor coupon to the terminal; transmitting the sponsor coupon from the terminal to an operator; transmitting, at the operator, a filter and charging rule for sponsor traffic configured based on the service coupon to the terminal; re-requesting, at the terminal, the service provider for the sponsor service to receive sponsor traffic service from the service provider; and charging, at the operator, the service provider for the sponsor traffic.

Also, a billing control apparatus of a mobile communication system of the present invention includes a terminal which transmits a sponsor service request for use of a sponsor service to a service provider and transmits, when a sponsor coupon is received from the service provider, a sponsor service re-request to an operator; a service provider which issues, when the sponsor service request is received from the terminal, the sponsor coupon to the terminal, and provides, when a sponsor service re-request is received from the terminal, the user with the sponsor traffic service; and an operator which configures, when the sponsor coupon is received from the terminal, a filtering and charging rule for the sponsor traffic using the received sponsor coupon, notifies the terminal of the configuration, and charges the service provider for the sponsor traffic.

Advantageous Effects

In the mobile communication system according to an embodiment of the present invention, the network operator performs verification, filter installation, and charging rule configuration using the coupon issued by the service provider in response to the sponsor traffic request of the terminal, and the network operator charges the service provider for the sponsor traffic from the service provider to the terminal. Accordingly, the sponsor traffic processing method according to an embodiment of the present invention is advantageous in minimizing the dynamic configuration resource of the third party server information and the online transactions between the third party server and the server located in the operator network.

BRIEF DESCRIPTION OF THE DRAWINGS

FIG. 16 is a diagram illustrating a coupon-based sponsor charge scenario in the mobile communication network according to the second embodiment of the present invention.

DETAILED DESCRIPTION OF EXEMPLARY EMBODIMENTS

Figure 1:
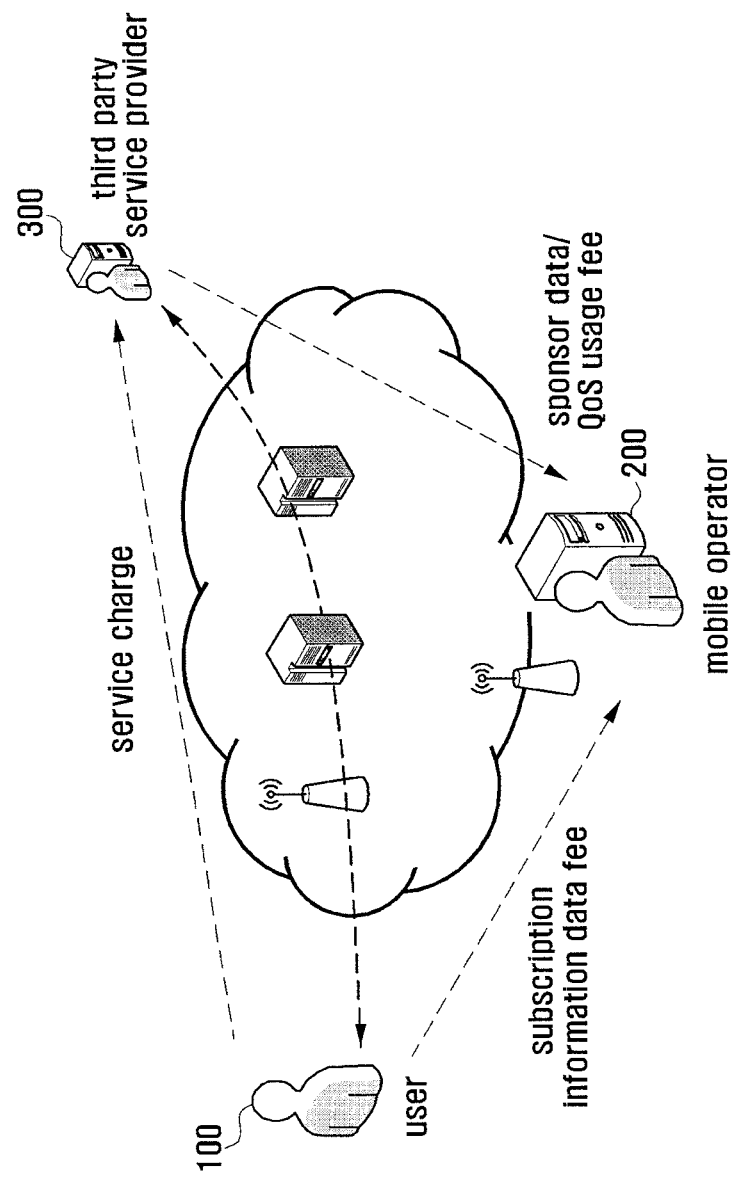
FIG. 1 is a diagram illustrating the concept of the sponsor traffic in a mobile communication network.

Exemplary embodiments of the present invention are described with reference to the accompanying drawings in detail. The same reference numbers are used throughout the drawings to refer to the same or like parts.

Although the description is made with specific terms such as 'service provider and coupon, such words are of description in order to help understand and it is obvious to skilled in the art that the present invention can be practiced without one or more of the specific details. Detailed description of well-known functions and structures incorporated herein may be omitted to avoid obscuring the subject matter of the present invention.

In the following description, the term "terminal" denotes a user terminal requesting the service provider for a service and is used interchangeably with "UE," the term "network operator" is used interchangeably with "operator," and the term "service provider" is used interchangeably with "sponsor" and "$3^{rd}$ party services." Also, the term "sponsor traffic" denotes the traffic occurring in association with the service provider, and the term "sponsored charge" denotes that the service provider pays the bill charged for the network access of the terminal.

An embodiment of the present invention proposes a method for billing the service provider rather than the terminal for the sponsor traffic in the mobile communication network. The communication network may be composed of terminals, a network operator, and a service provider. For this purpose, in an embodiment of the present invention, a sponsor coupon is issued according to a contract between the sponsor and the operator, and the coupon is sent to the terminal or the network operator. For the former case, a method for the terminal to bypass the coupon to the operator server is proposed. Also, an embodiment of the present invention proposes a method for installing a filter and rule for the sponsored charge based on the contents/service server information in the coupon transmitted to the network operator. Also, an embodiment of the present invention proposes a method for checking the sponsorship expiry associated with the sponsored usage amount specified in the coupon and notifying the sponsorship expiry or arrival of the sponsorship expiry.

In order to implement the present invention, the first embodiment of the present invention is characterized in that if the terminal requests for the sponsor traffic-based service, the service provider recognizes the sponsor traffic request and issues a sponsor coupon capable of being used in the mobile communication network to the terminal. The terminal sends the network operator the coupon, and the network operator configures the sponsor traffic filtering and charging rule based on the information contained in the coupon and notifies the terminal of the configuration result. Afterward, the terminal accesses the service provider via the network operator to receive the sponsor traffic service, and the network operator charges the service provider for the sponsor traffic consumed by the terminal.

In order to implement the present invention, the second embodiment of the present invention is characterized in that if the terminal requests for the sponsor traffic-based service the service provider recognizes the sponsor traffic-service request and issues a sponsor coupon capable of being used in the mobile communication network and sends the sponsor coupon to the network operator. Then the network operator configures the sponsor traffic filter and charging rule and notifies the service provider of the configuration result. Afterward, the user accesses the service provider via the network operator to receive the sponsor traffic-based service, and the network operator charges the service provider for the sponsor traffic consumed by the terminal.

A description is made of the operations according to the embodiments of the present invention.

In the current 3GPP, a solution of supporting the sponsor traffic for charging the third party rather than the terminal consuming the corresponding traffic is under discussion. FIG. 1 is a diagram illustrating the concept of the sponsor traffic. As shown in FIG. 1, the sponsor traffic denotes the traffic which is consumed by the terminal and paid by a third party.

Figure 2:
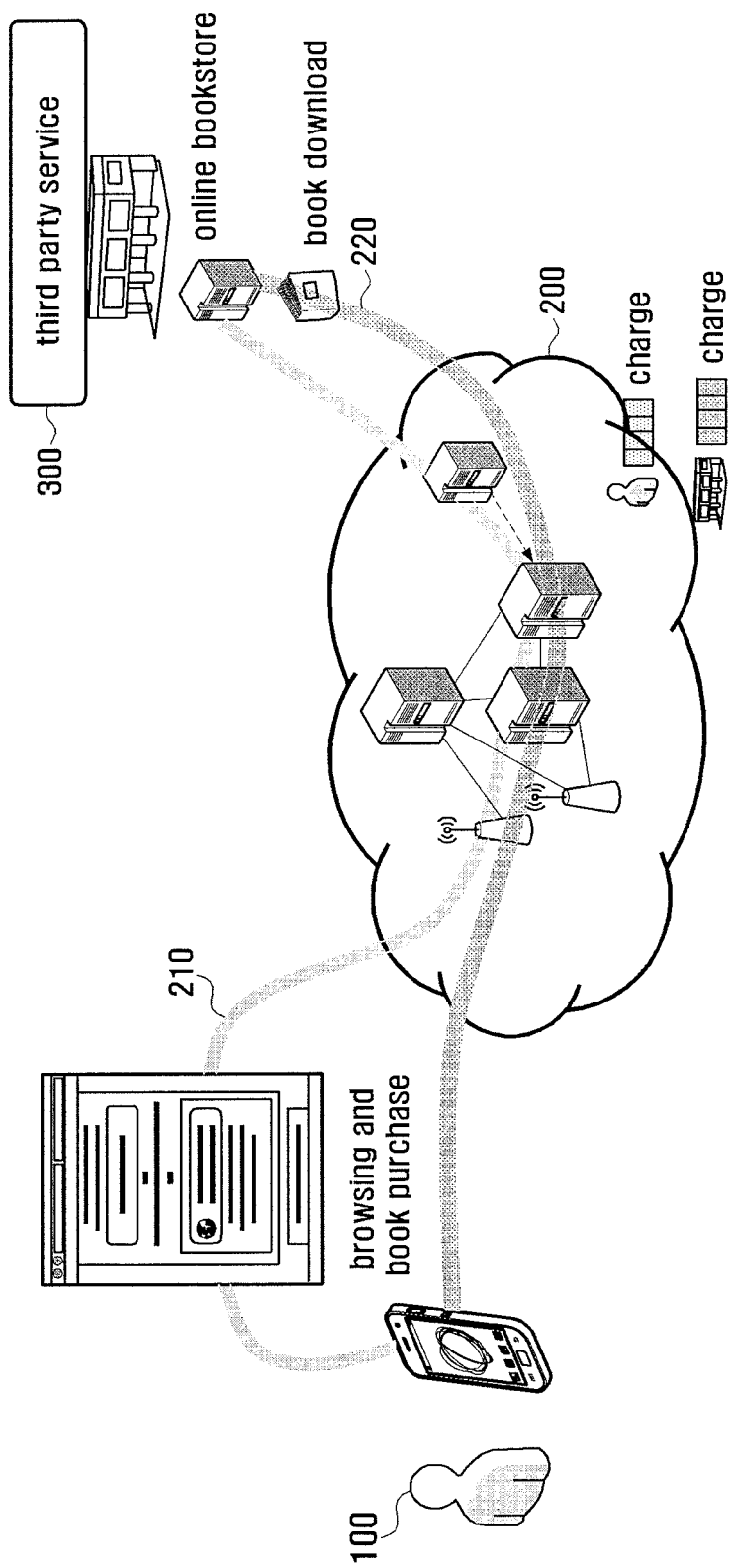
FIG. 2 is a diagram illustrating exemplary sponsor traffic in a mobile communication network.

For example, if the terminal accesses an online bookstore as a third party to search for and/or purchase an ebook, the third party pays for the ebook download traffic consumed by the terminal. At this time, the billing policy can be implemented in various manners. In the case that the terminal accesses the online bookstore to purchase an ebook, the entire cost of ebook search and download of purchased ebook may be charged to the online bookstore. Also, it is possible to charge the terminal for the ebook search traffic (reference number 210 of FIG. 2) and the online bookstore for the purchased ebook download traffic since the push of the ebook purchase button (reference number 220 of FIG. 2) as shown in FIG. 2.

Figure 3:
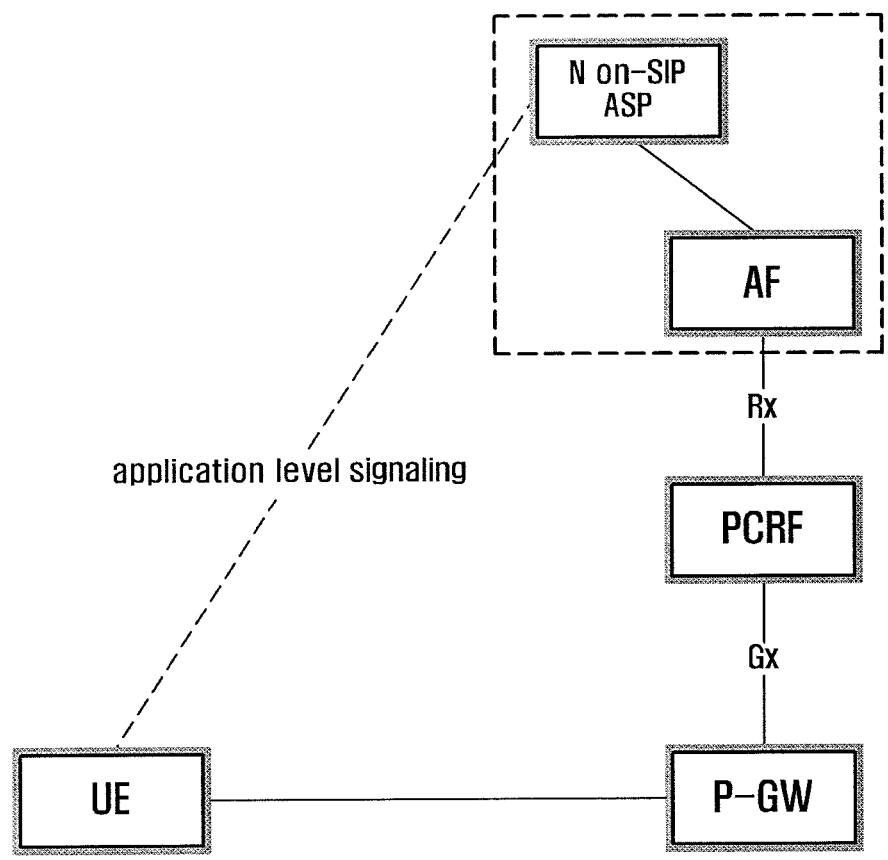
FIG. 3 is a diagram illustrating Policy Charging Control-extended solution structure under discussion currently in 3GPP.

FIG. 3 is a diagram illustrating Policy Charging Control-extended solution structure under discussion currently in 3GPP.

Referring to FIG. 3, the non-SIP ASP 310 as the third party server (bookstore store server in FIG. 2) sends the information on the book download traffic to an operator network server (AF in FIG. 3) processing the sponsor traffic. If this information is received, the operator network server (AF) sends the sponsor traffic information to a Policy and Charging Rules Function (PCRF) entity. The then the PCRF sends a Packet Data Network Gateway (PGW) a message to generate a billing record on the sponsor traffic with the sponsor ID. Then the PGW generates the billing record on the sponsor traffic with the sponsored ID other than the user ID. That is, the PGW charges the $3^{rd}$ party other than the UE 100 for the sponsor traffic.

The Policy and Charging Control extended solution of FIG. 3 may cause the following issues.

Figure 4:
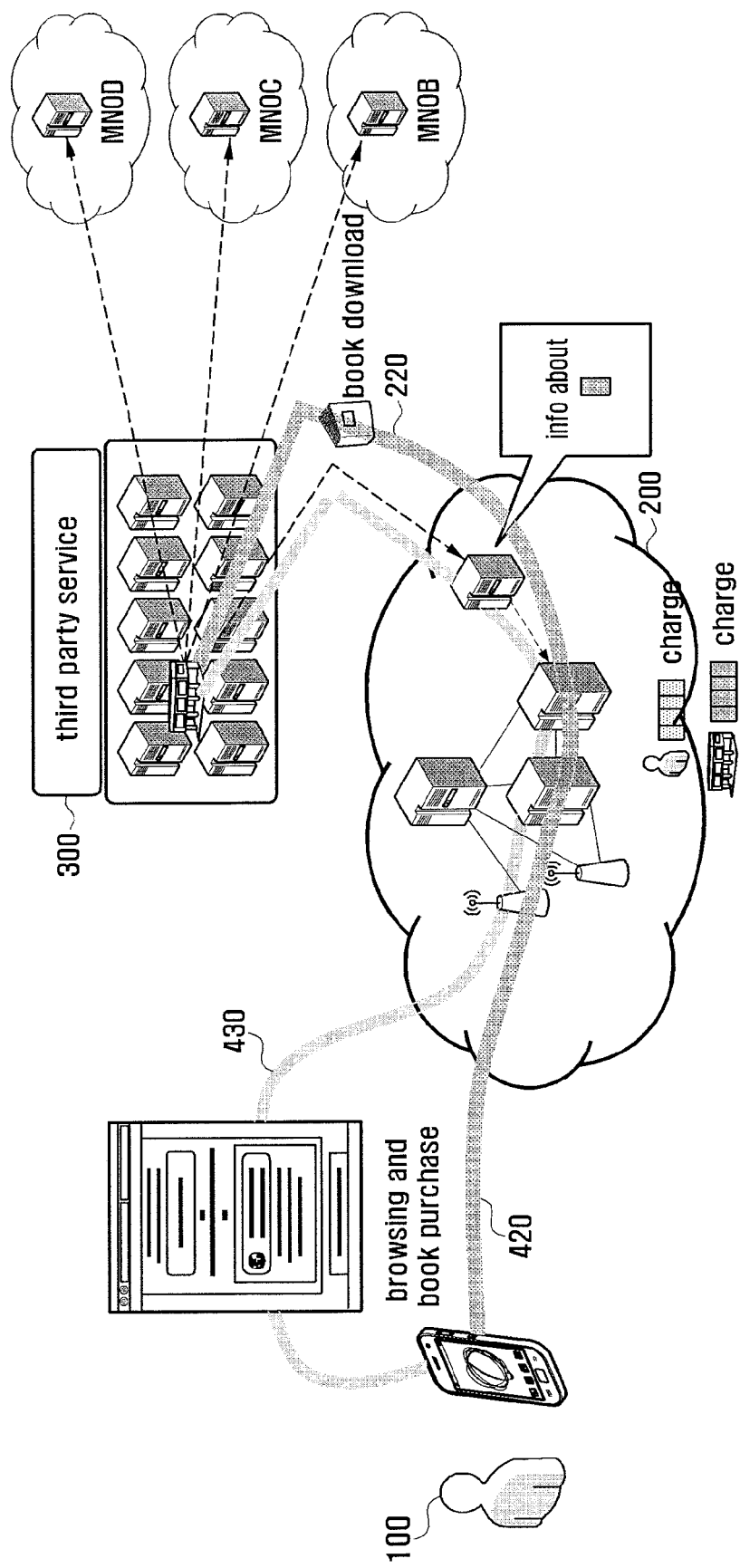
FIG. 4 is a diagram illustrating the operation in the Policy Charging Control-extended solution structure under discussion currently in 3GPP.

First, the third party server has to send the sponsor traffic information and a signal indicating the start and end of the sponsor traffic in order for the PGW to generate the billing data. Accordingly, the third party server has a connection with the server connected to the PGW in the operator network. In the case of providing a global service, the third party has to connect to all of the operator's servers as shown in FIG. 4 and send, whenever the sponsor traffic occurs, the sponsor traffic information to the operator's servers. Since the connection between the non-SIP ASP and AF is out of the scope of 3GPP, it is necessary for the third party to support other preparatory protocols supported by the operator's servers, resulting in increase of the third party's burden (N:M connection).

Second, it is necessary for the third party server to fix the session transmitted the traffic to be sponsored. By using the static address and port of the server to transmit the corresponding traffic and configure the PGW with the static information, it is possible, when the corresponding traffic occurs, to charge for the traffic with the sponsored ID. In order to accomplish this, however, the address and port of the server to transmit the corresponding traffic has to be fixed. However, if the third party is an enterprise company, it is likely to use Central Data Center (CDF) or Internet Data Center (IDC) and this means that it is difficult to fix the server address and port.

There is therefore a need of consideration of minimizing the aforementioned issues, i.e. the dynamic configuration resource of the third party server information and online transaction between the third party server and the operator network server.

Figure 5:
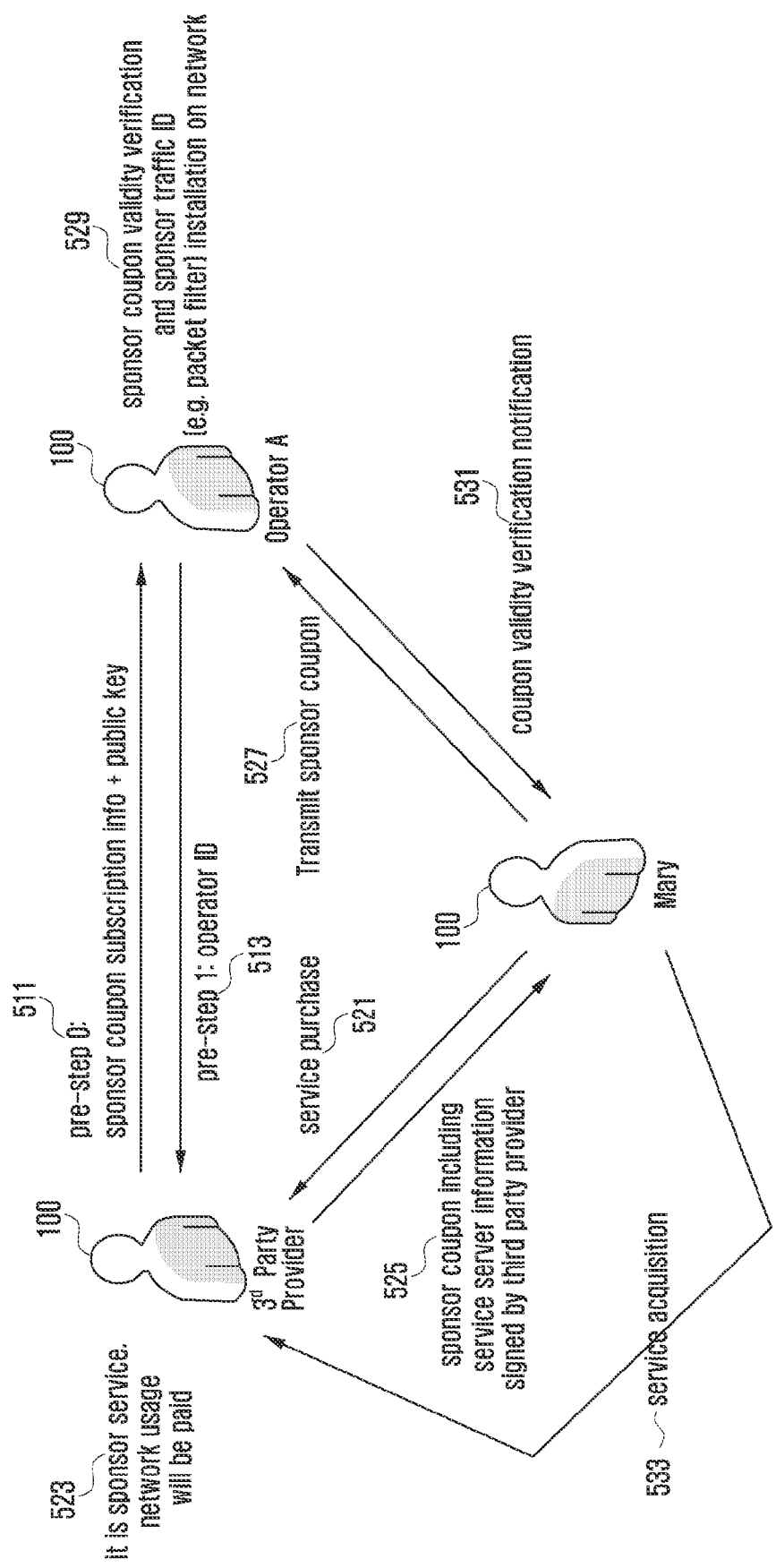
FIG. 5 is a diagram illustrating the coupon-based sponsor charge scenario in the mobile communication network according to the first embodiment of the present invention.

FIG. 5 is a diagram illustrating the operation of processing the sponsor traffic in consideration of minimizing the dynamic configuration resource of the third party server information and online transaction between the third party server and the operator network server according to the first embodiment of the present invention.

Referring to FIG. 3, the operator provides a sponsor coupon service for the service provider starting the third party service, and the third party provider has to subscribe to the sponsor coupon service provided by the operator.

Figure 6:
FIG. 6 is a diagram illustrating exemplary sponsor coupon service subscription information planning according to an embodiment of the present invention.

FIG. 6 is a diagram illustrating exemplary sponsor coupon service subscription information planning according to an embodiment of the present invention.

As shown in FIG. 6, the coupon specifies a data model along with volume (total) and validity window). For example, every month——~1G: 40$, ~2G: 70$, ~3G: 100$.

In order to process the sponsor traffic, the service provider 300 and the operator 200 should exchange the information for verifying the coupon in advance before issuing the coupon to the UE 100. In order to accomplish this, the service provider 300 sends the operator the sponsor coupon subscription information and a public key for use in authenticating the validity of the signal of the coupon to be issued afterward at step 511. Then the operator 200 sends the service provider 300 the operator ID to share additional security key at step 513. Through steps 511 and 513, the service provider 300 and the operator 200 are prepared for processing the sponsor traffic.

Afterward, the UE 100 requests for the sponsor traffic-based service (service request) (e.g. click download button after payment for an ebook) at step 521. When requesting the service at step 511, the UE 100 sends the currently using operator ID together. If the service request is received from the UE 100, the service provider 300 recognizes the sponsor traffic-based service request at step 523, generates a sponsor coupon capable of being used in the corresponding operator network, and signs the issued coupon with a private key paired with the public key notified to the operator. It is also possible to encrypt the sponsor coupon with the shared security key in addition to the signature. The reason for signing the coupon with the private key is to prevent the UE 100 to modify the coupon for use in other purpose. That is, if the coupon is signed with the private key of the service provider, the user 100 cannot modify the information in the coupon and thus may use for the corresponding service. Afterward, the service provider 300 sends the UE 100 a retry command and the issued coupon in response to the service request at step 525. At this time, the server address to access for the retry is identical with the server address included in the coupon.

At this time, the coupon transmitted from the service provider to the UE 100 can be formatted as shown in table 1.

TABLE 1

Example of Content-Provider-issued Sponsored Charging Coupon

- Issuer ID: Content Provider ID ( Sponsor ID)
- applied network : Operator ID
- Coupon ID: Serial Coupon Number
- Usage Model: one of {total amount, total duration, until signaling the end }
- Usage Model Parameters includes at least one of followings
    + Total amount: 300 MB if Usage Model is
    + Total duration: n hours, n days or n months
    + Until signaling the end
- Sponsor Traffic Server : List IP address/Port and/or URL of the Server
- Time Stamp
- Signature by Issuer
    + Signature of the coupon including all of the above parameter
    ( Signed by Issuer's private key shared with Operator )

The coupon issued as shown in table 1 includes a service provider ID, operator ID, coupon ID, usage model, service provider connection address, and coupon usage start time (time stamp), and all the parameters of the coupon are signed with the private key of the service provider.

Upon receipt of the coupon, the UE 100 bypasses the received coupon to the operator 200 at step 527. If the coupon formatted as shown in table 1 is received from the UE 100, the operator 200 verifies the validity of the coupon with the public key of the service provider 300 which is received at the contract step (step 511 of FIG. 5) at step 529. If the validity of the coupon is verified successfully, the operator 200 configures a sponsor traffic filter using the server information included in the coupon and the charging to charge for the filtered traffic with the sponsor ID. At this time, the operator 200 may establishes a new bearer, if necessary, and configures the filtering and charging for the newly established bearer.

After verifying the validity of the coupon and configuring the filtering and charging at step 529, the operator notifies the UE of the filter configuration and coupon validation result at step 531. Then the UE 100 requests for the service again to the retry address provided by the third party provider 300 at step 533. At this time, the traffic generated according to the service request of the UE 100 is the sponsor traffic such that the operator 200 generates a charging record based on the subscription information of the sponsor ID for the sponsor traffic. That is, the operator 200 charges the third party provider 300 other than the UE 100 for the sponsor traffic.

Figure 7:
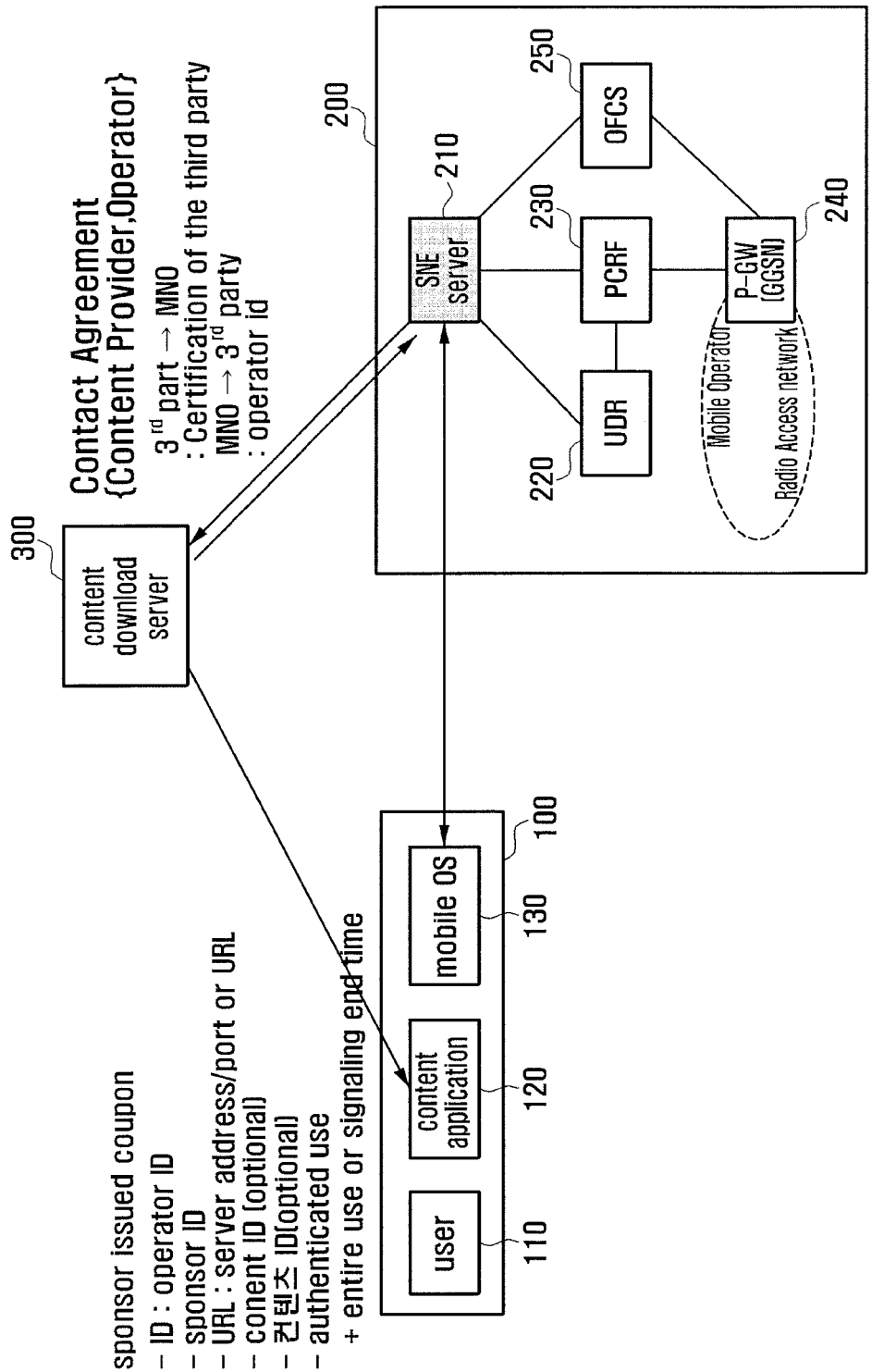
FIG. 7 is a diagram illustrating architecture of a mobile communication system according to an embodiment of the present invention.

FIG. 7 is a diagram illustrating architecture of a mobile communication system for processing sponsor traffic according to an embodiment of the present invention.

Referring to FIG. 7, the UE 100 may include a user 110, a content application 120, and a mobile OS 130; and the operator 200 includes SNE server (SNES) 201, a UDR 220, a PCRF 230, and PGW (GGSN) 240, and an OFCS 250. Here, the user 110 downloads a coupon and processes and displays the information related to the sponsor traffic. The content application 120 is the application for processing the sponsor traffic, and the mobile OS 130 is responsible for radio communication with the operator 200.

When processing the sponsor traffic, the SNE server 210 of the operator 200 verifies the coupon received from the UE 100, and configures a sponsor traffic filter using the server information contained in the coupon, and generates the charging for charging for the filtered traffic with sponsor ID. The UDR (User Data Repository) 220 stores the charging, and the PCRF 230 generates a message for generating a billing record with the sponsor ID for the sponsor traffic, the PGW 230 generates the billing record with the sponsored ID other than user ID for the sponsor traffic according to the message transmitted by the PCRF 230, and OFCS 250 issues a bill based on the billing record.

Figure 8:
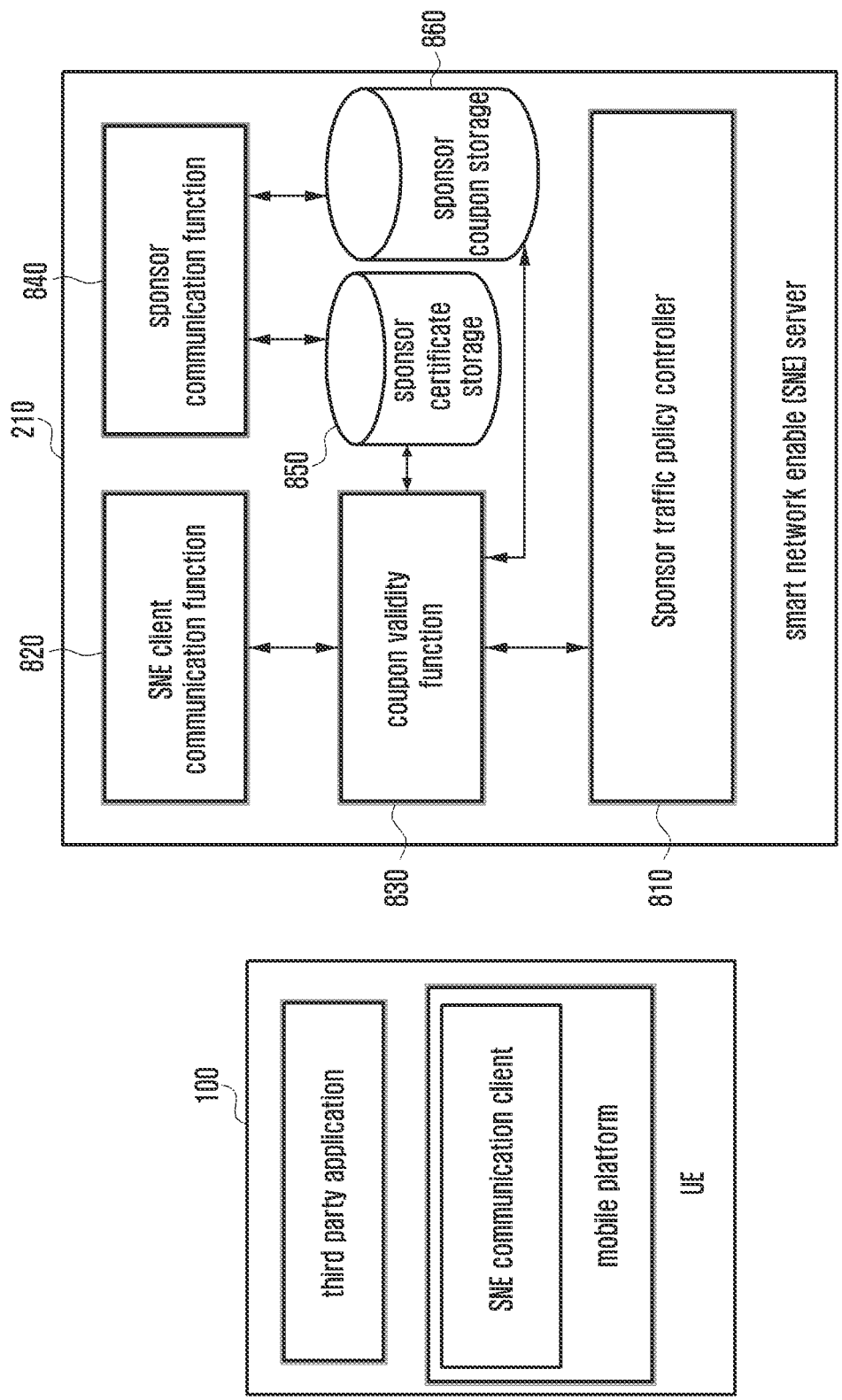
FIG. 8 is a diagram illustrating internal configuration the SNE server in FIG. 7.

FIG. 8 is a diagram illustrating configurations of the SNE communication client module of the UE and the SNE server 210 of the operator 200 in FIG. 7.

Referring to FIG. 8, the mobile platform of the UE for processing the sponsor traffic includes the SNE communication client module which performs the following functions. First, the SNE communication client module requests the SNE server 210 of the operator network to install the coupon received from the third party application. If the SNE server 210 notifies of the expiry of the coupon, it sends the notification to the third party application. Also, the SNE communication client module is responsible for communication function with the SNE server 210 of the operator network.

Also, the SNE server 210 includes four function modules and two repositories, the functions being as follows.

The SNE client communication function 820 is responsible for communication with the SNE communication client module. The SNE client function 820 receives the coupon of the third party application transmitted by the UE and transfers the coupon to the coupon validity function 830 to verify the validity. If the sponsored charge charging is installed by the sponsor traffic policy controller, the SNE client communication function 820 notifies the SNE communication client module of the UE of the result and communicates with the SNE communication client module in the mobile platform of the UE.

The sponsor communication function 840 is responsible for the server function when the third party makes a sponsorship contract with the operator, stores the information input by the sponsor in the sponsor certificate storage 850 along with the certificate including the public key of the sponsor, and stores the information on the coupons installed for the operator network and the actual operator network usage information in the sponsor coupon storage 860. The sponsor communication function 840 is responsible for all communication functions between the third party and the operator such as operator network information update of the third party.

The coupon validity function 830 verifies the validity of the coupon issued by the third party using the supplementary information such as third party's public key and shared security key stored in the sponsor authentication storage 850 and notifies of the verification result.

The sponsor traffic policy controller 810 generates the TFT and charging using the information on the coupon verified by the coupon validity function 830 and installs the generated TFT and charging. In addition to this function, the sponsor traffic policy controller 810 is responsible for all functions interoperating with other entities of the operator network.

The sponsor coupon storage 860 store all information as well as the certificate including the public key of the sponsor which has been input by the sponsor when the third party makes a sponsor contract with the operator. The sponsor certificate storage 850 stores the coupons received from the SNE communication client module in the mobile platform of the UE and the sponsor traffic information used by the UE for the coupon.

According to an embodiment of the present invention, a description is made of the sponsor traffic processing procedure in the order of coupon activation procedure (Activate Sponsored Charging Coupon), packet filter installation and charging configuration procedure, sponsor traffic processing procedure (expiration alerting), sponsor traffic process end procedure (Deactivate Sponsored Charging), and billing procedure (Cash the sponsored traffic).

Figure 9:
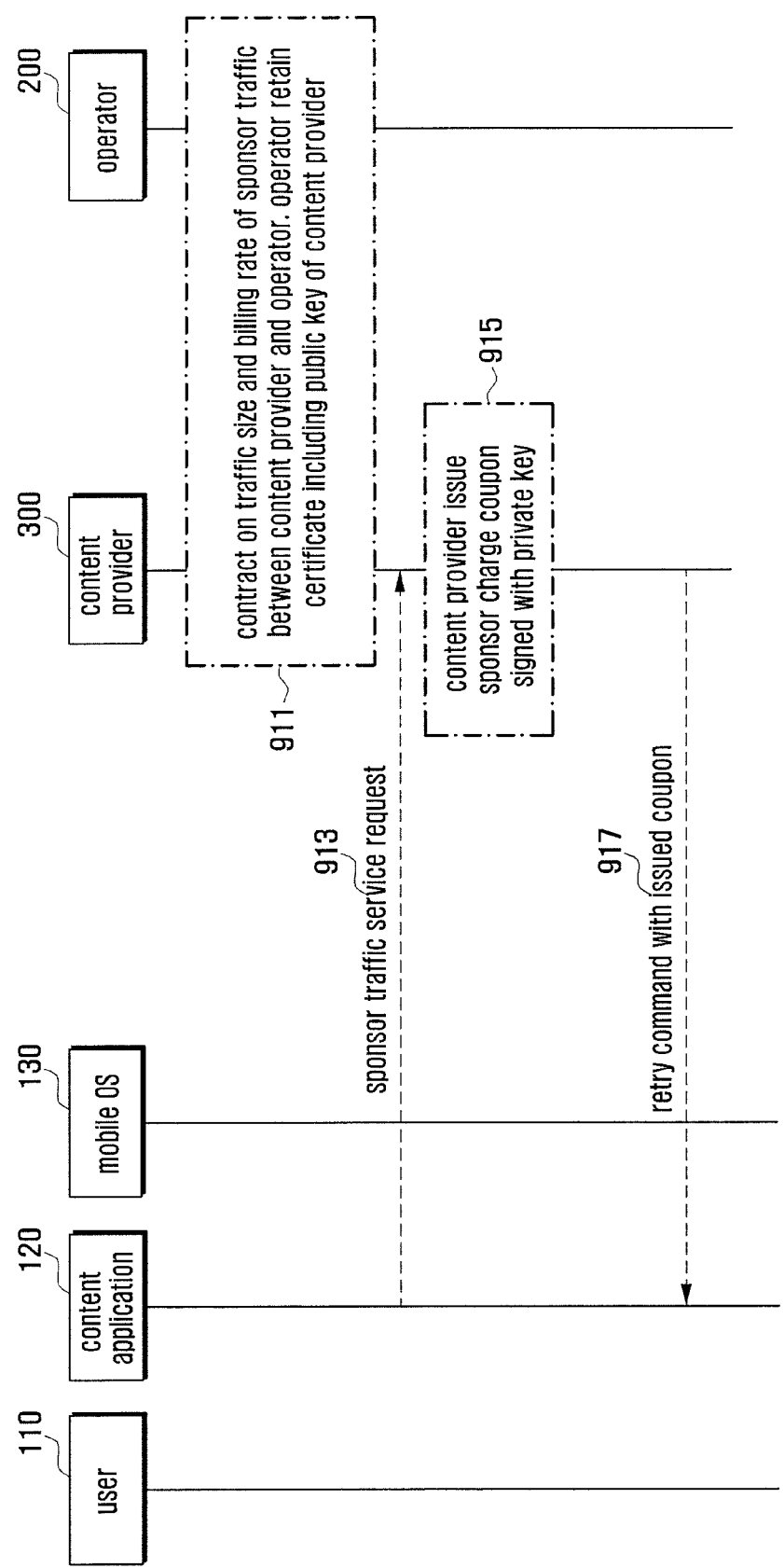
FIG. 9 is a diagram illustrating the procedure of issuing and transmitting a coupon according to an embodiment of the present invention.

First, a description is made of the coupon issue and delivery. FIG. 9 is a diagram illustrating the procedure of activating sponsor-charging coupon according to an embodiment of the present invention.

Referring to FIG. 9, reference number 911 denotes the step of making a contract for processing the sponsor traffic between the service provider 300 and the operator 200. That is, the operator 200 offers the sponsor coupon service, and the content provider 300 subscribes to the sponsor coupon service offered by the operator 200 at step 911. In order to processor the sponsor traffic, the content provider 300 and the operator 200 exchange the information for verifying the coupon in advance. At this time, the content provider 300 sends the operator 200 the sponsor coupon subscription information as shown in table 1 and a public key for use in verifying the validity of the coupon, the operator 200 sends the content provider 300 the operator ID, and they may share the security key (Contractual agreement between content provider and the operator on the amount of the sponsored traffic and its charging rate. The operator has the certificate including the public key of the content providers.).

Afterward, the UE 100 requests the content provider 300 for the service which uses the sponsored traffic and sends the currently used operator ID. If the service request is received from the UE 100, the content provider 300 recognizes the sponsor traffic request, generates the sponsor coupon as shown in table 1 that can used in the operator network, and signs the coupon with the private key at step 915 (The contents provider issues the sponsored charging coupon signed by its private key). As aforementioned, the reason for signing the coupon with the private key is to prevent the UE 100 to modify the coupon for use in other purposes. Additionally, the coupon may be signed and encrypted using the shared security. Afterward, the content provider 300 sends the retrial command and the generated coupon in response to the service request from the UE 100 through inbound signaling at step 917. At this time, the server address to access for retry is identical with the server address included in the coupon. The currently used operator ID is transmitted together.

Figure 10:
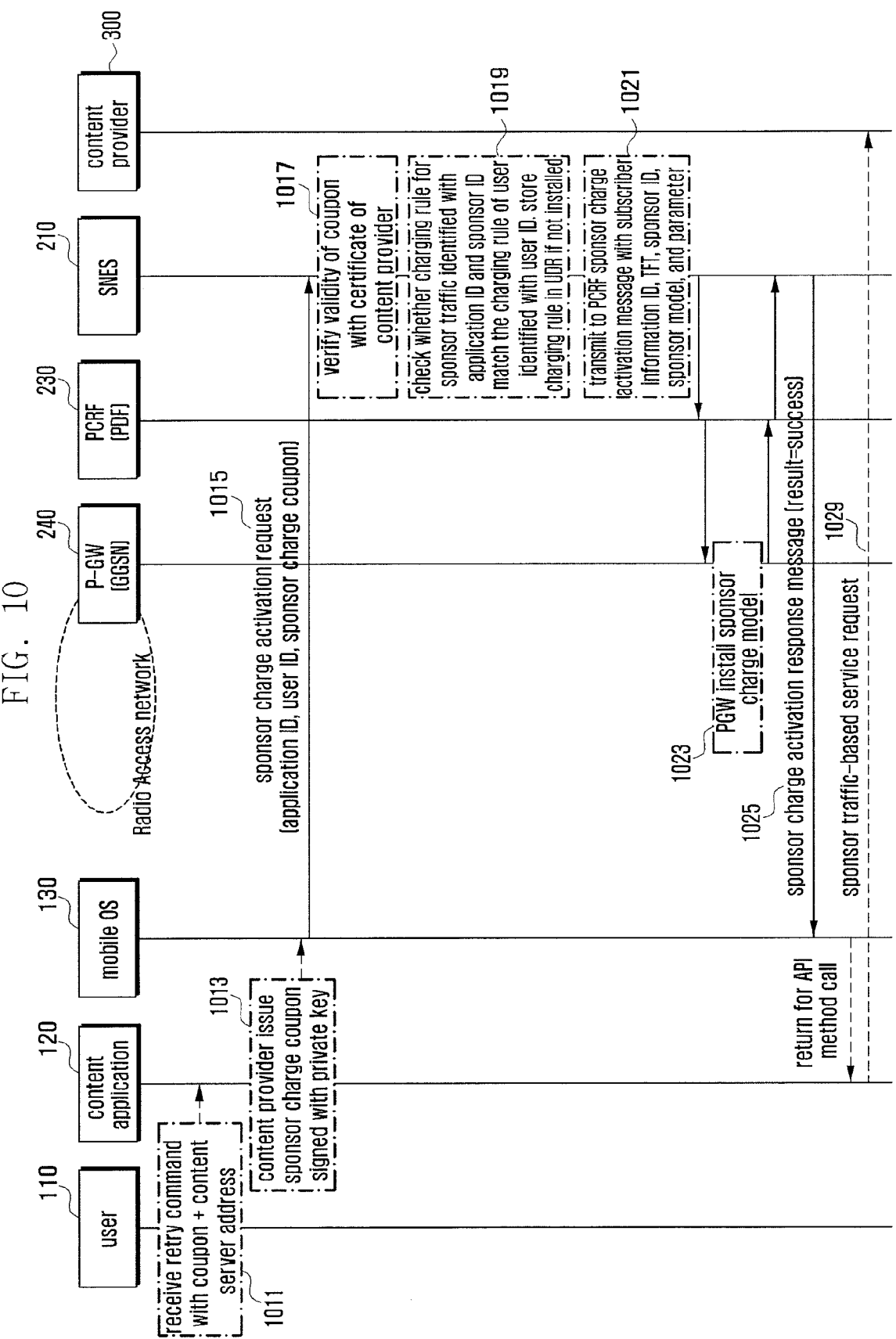
FIG. 10 is a diagram illustrating the procedure of installing the packet filters and configuring charging rules for the sponsored traffic according to an embodiment of the present invention.

FIG. 10 is a diagram illustrating the procedure of installing the packet filters and charging rules for the sponsored traffic at the operator 200 according to an embodiment of the present invention.

Referring to FIG. 10, the user 110 of the terminal 100 receives the coupon and a retry command from the content provider 300 and transfers these to the content application 120 of the UE 100. Then the content application 120 calls the sponsored charge method for providing the UE 100 with the received coupon as parameter and sends it to the OS 130 at step 1013, and the mobile OS 130 sends a service request message including the application ID, user ID, and sponsor coupon to the SNES 210 of the server in the operator network at step 1015.

If the sponsored charge activation request is received, the SNES 210 verifies the validity of the sign of the coupon with the public key registered by the content provider at step 1017. In addition, if it is signed and encrypted with the security key, the validity verification and description are performed using the shared security key. If the validity is verified successfully, the SNES 210 determines whether the charging rule for the sponsor traffic identified with the corresponding application id and sponsored id is installed in the charging rule of the user identified with the user id already and, if not installed, stores the charging rule in the UDR (check UDR if there is an existing record for user ID and coupon (sponsor ID, content ID). If there is no existing record, SNES adds (install) the sponsored charging coupon).

At this time, in order to force the stored rule, it is necessary to install the rule in the PGW. For this purpose, the SNES 210 notifies the PGW 240 of this via the PCRF (send activate sponsored charging message to the PCRF with PCRF with subscription ID, TFT, sponsor ID, sponsor model and its parameters) at step 1021, and the PGW 240 installs the sponsored charging model at step 1023.

In more detail, the SNES 210 requests the PCRF 230 for TFT including user's subscription information id, sponsor's subscription information ID, a packet filters for sponsor traffic and activating the sponsored charge with the usage models as parameters. In the case of using the legacy bearer, only the filter and charging rule are installed in the PGW 240 and, in the case of using a new bearer, a bearer using the corresponding filter and charging rule is generated for the PGW 240 through IP-CAN Session Modification procedure. The PGW 240 reports the installation result of the sponsored charge model to the SNES 210 via the PCRF 230.

If the result of the Activate sponsored charge request is received from the PGW 240, the SNES 210 notifies the mobile OS 130 of the UE 100 of the sponsor coupon installation result (activate sponsored charging response (result=success) at step 1025, and the mobile OS 130 transfers it to the content application 120 (return from API method call) at step 1027. Accordingly, the execution result of the sponsored charge method called by the content application 120 is returned to the content application 120. Then the content application 120 requests the content server matching the server address included in the sponsor coupon received in the retry command for the service, and the PGW 240 generates a charging record with the sponsored id for the sponsor traffic of the UE 100.

In the case that the content server address requested in the retry command of the content server 300 and the content server address included in the coupon are URIs, the SNES 210 performs DNS query for the corresponding URI, configures the packet filter for the sponsor traffic with the result address, and sends the result address to the UE 100 such that the UE 100 performs access to the service with the address transmitted by the server as the content server address.

In the verification procedure, if the content provider 300 has subscribed to the sponsor traffic service in a prepaid manner and if the credit of the sponsor subscription information ID expires, the SNES 210 determines that the validity verification on the sponsor coupon for the content provider 300 has failed.

Although FIG. 10 is directed to the flows in which the user 100 sends the sponsored charge activation message to the SNES server 210 of the operator directly, the present invention is not limited thereto.

In detail, the UE may transmit the sponsored charge activation message to the SNES 210 using NAS (Non-Access Stratum) protocol. For this purpose, if PCO (Protocol Configuration Option) is configured in the NAS message for activating the sponsored charge, the UE is capable of transmitting the sponsored charge activation message to the PGW 240 directly. Here, the sponsored charge activation message (NAS message) may include the parameter identical with that in the message specified at step 1015. If the message is received, the PGW 240 forwards this message to the PCRF 230 and thus the PCRF 230 delivers this message to the SNES 210. If the sponsored charge activation message is received from the PCRF 230, the SNES 210 is capable of performing step 1017 and subsequent steps.

Figure 11:
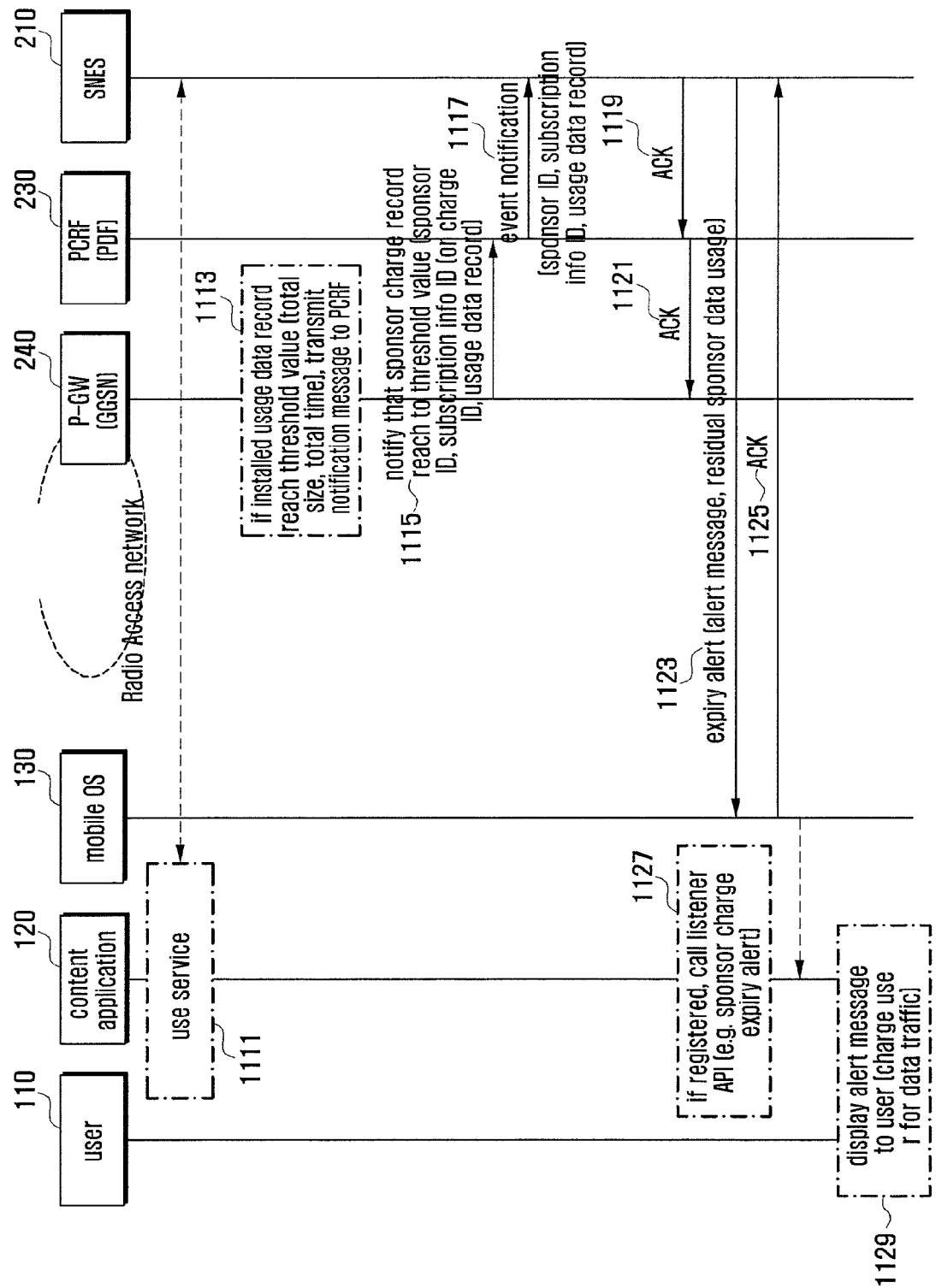
FIG. 11 is a diagram illustrating a procedure of processing sponsor traffic according to an embodiment of the present invention.

FIG. 11 is a diagram illustrating a procedure of alerting expiry of sponsor traffic according to the usage model of the coupon in processing the sponsor traffic.

Referring to FIG. 11, the download application 120 of the UE downloads the content data (e.g. streaming video data) from the content provider 300 at step 1111. Here, the content data may be any of electronic book, movie, and music data. When the download application 120 of the UE downloads the content data, the PGW 240 determines whether the usage data record of the coupon installed in the PGW reaches a threshold (expires) and, if it reaches the threshold, notifies the PCRF of the expiry at step 1113. Then the PCRF 230 receives the threshold reach notification from the PGW 240, the notification including the sponsored ID, subscription information ID, charging ID, and usage data record. Then the PCRF 230 sends the SNES 210 an event notification (sponsored ID, subscription information ID, usage data record) at step 1117. If the event notification is received, the SNES 210 sends the PCRF 230 an ACK message at step 1119, and the PCRF 230 forwards the ACK message to the PGW 240 at step 1121.

Afterward, the SNES 210 sends the mobile OS 130 of the UE an alert message, i.e. the expiry alert message including the remained data usage amount information. Then the mobile OS 130 of the UE sends the SNES 210 an ACK at step 1125. Also, the mobile OS sends the alert to the content application 120, the content application 120 processes the alert message (Call the listener API if it was registered (for example Alert sponsored Charging going to expire), and the user 110 displays the alert message to the user at step 1129.

If the sponsor traffic reaches the usage amount configuration value of the coupon in the state that the UE is performing the sponsor traffic-based service, the operator alerts the UE 100 and thus the UE 100 displays alert message. At this time, the usage amount of the coupon may be expressed as the sponsor traffic size (total amount, time (total duration), and 'until end signals'.

Figure 12:
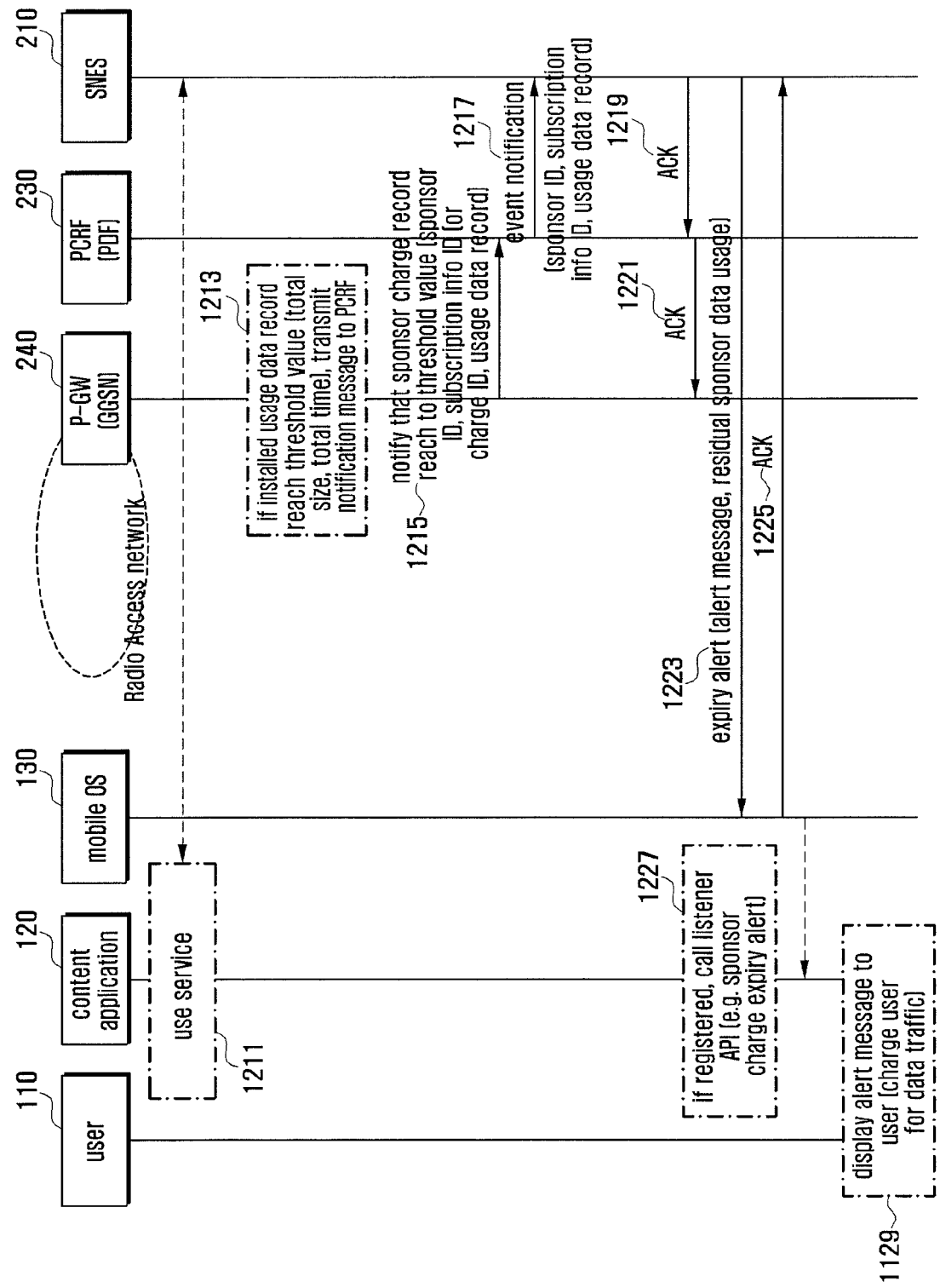
FIG. 12 is a diagram illustrating an operation procedure in the case where the coupon usage amount is expressed as data amount and/or time duration according to an embodiment of the present invention.
Figure 13:
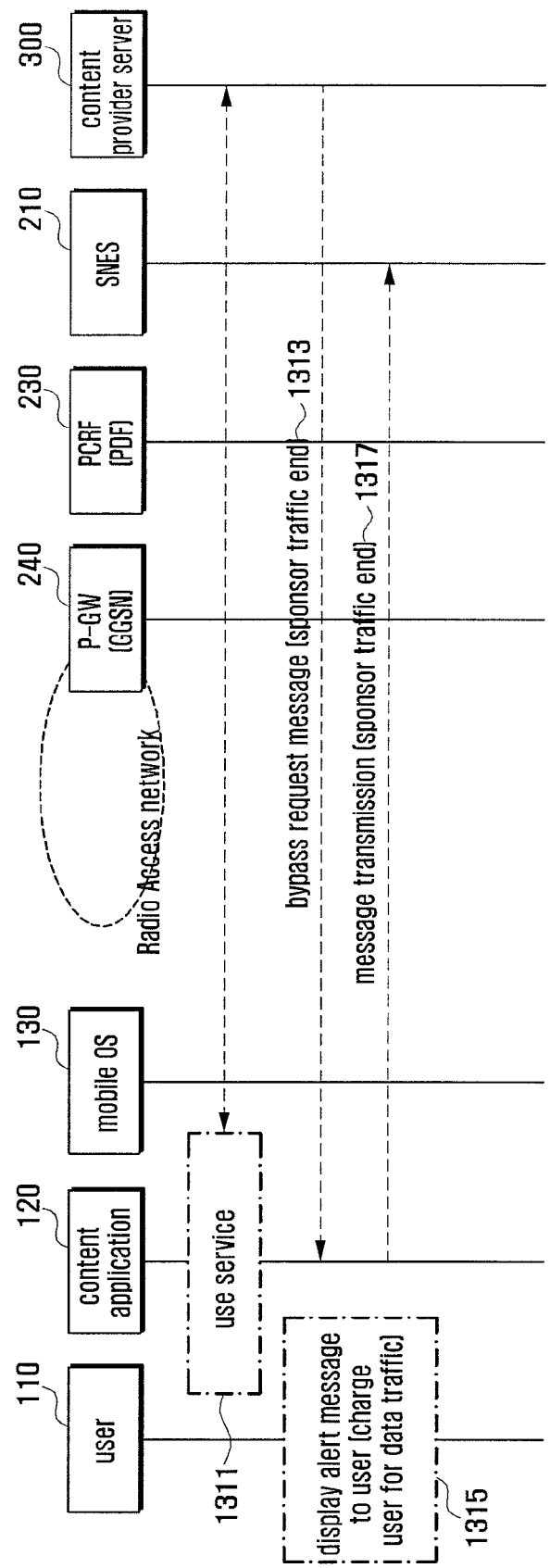
FIG. 13 is a diagram illustrating an operation procedure in the case where the coupon usage is terminated by the service provider according to an embodiment of the present invention.

FIG. 12 is a diagram illustrating an operation procedure in the case where the coupon usage amount is expressed as total amount and total duration, and FIG. 13 is a diagram illustrating an operation procedure in the case where the coupon usage amount is expressed as 'until end signals'.

Referring to FIG. 12, if the coupon usage amount is expressed as the total amount, or total duration, the operation is performed in similar procedure to FIG. 11. That is, if the content application 120 is using the sponsor traffic-based service at step 1211, the PGW 240 checks whether the usage amount of the coupon installed in the PGW reaches the threshold and, if so, notifies the PCRF of this. Here, the usage amount of the coupon can be the total amount or total duration and, if the time or size reaches a predetermined degree of 90%, the expiry of the coupon usage amount is alerted (When the install usage data record reaches the threshold (total amount, total duration), it sends notification to the PCRF).

Then, performing steps 1215 to 1221, the PGW 240 sends the PCRF a threshold reach notification (Threshold reach notification for the sponsored charging records (sponsored ID, subscription ID (or charging ID), usage data record), and the PCRF 230 sends the SNES 210 the event notification (sponsored ID, subscription ID, usage data record). If the event notification is received, the SNES 210 sends the PCRF 230 an ACK message, and the PCRF 230 forwards the ACK message to the PGW 240.

Afterward, the SNES 210 sends the UE 100 an expiry alert message (Alert message, Remaining sponsored data usage) at step 1223. Then the UE 100 sends the SNES 210 an ACK at step 1125. The UE calls the listener API if it was registered (for example Alert sponsored Charging going to expire and displays the alert message to the user at steps 1227 and 1129.

Although FIGS. 11 and 12 are directed to the case where an alert is output when a predetermined time elapses in the state that the total size of the sponsor traffic remained after use is at a predetermined level, the present invention is not limited thereto. For example, the alert may be output whenever a predetermined amount of the sponsor traffic is consumed. For example, the alert may be output whenever 5 Mbyte of sponsor traffic is consumed. Assuming that the total duration of the sponsor traffic contracted between the service provider and the operator is 1 hour, the alert may be output whenever the 5-minute traffic is consumed.

Although an embodiment of the present invention is directed to the case where the operator alerts the user, the present invention is not limited thereto. For example, the operator may alert the user and the service provider simultaneously. If the alert is received, the service provider is capable of make an additional contract for the sponsor coupon with the operator such that the user received the sponsor service without inconvenience.

Referring to FIG. 13, the content application 120 is using the sponsor traffic-based service at step 1211 and, in this state if the coupon usage among is expressed as 'until end signal', receives the sponsor traffic termination message from the content server of the content provider at step 1313. That is, the content application 120 receives a bypass request message (sponsor traffic end) from the sever of the content provider 300. That is, the content server sends the content application the network bypass request message (bypassed message is encrypted) of the sponsor traffic termination at the end time at step 1313. Then the content application 120 displays the alert message to the user 110 (e.g. now data traffic is charged to you!!!) at step 1315. The content application 120 bypasses the encrypted bypass message to the SNES 210 (sponsored traffic end!) at step 1317.

Once the total size or total duration of the coupon usage amount expires completely in FIG. 12 or after performing step 1317 of FIG. 13, the operator 200 ends the sponsored charge procedure (deactivate sponsored charge).

Figure 14:
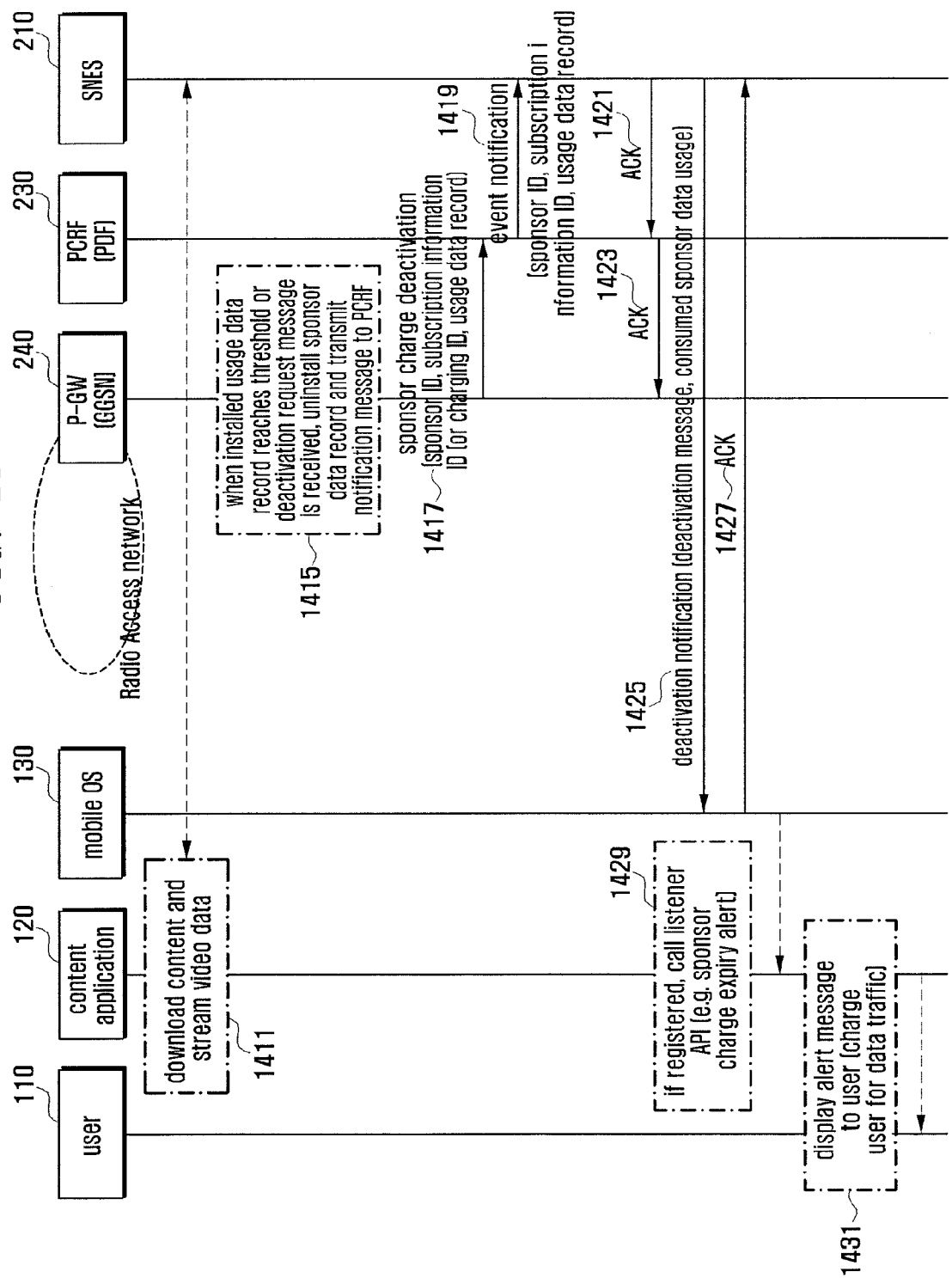
FIG. 14 is a diagram illustrating a procedure of deactivating the sponsored charge according to an embodiment of the present invention.

FIG. 14 is a diagram illustrating a procedure of deactivating the sponsored charge.

Referring to FIG. 14, the download application 120 of the UE is in the state capable of using the sponsor traffic service, i.e. the state capable of downloading content data from the content provider 300, at step 1411. In this state, if the sponsorship expiry is detected according to the coupon usage amount as described with reference to FIGS. 11 to 13, the SNES 210 notifies the PCRF 230 of the end of the sponsored charge at step 1413, and the PCRF 230 notifies the PGW of this. Then the PGW 240 uninstalls the corresponding traffic filter and charging rule at step 1415 (When the installed usage data record reaches its data usage or receive the deactivate request from SNES, it de-install the sponsored data records, and sends notification to the PCRF).

The PGW 240 notifies the PCRF 230 of the deactivation of the sponsored charge (deactivate sponsored charging (sponsored ID, subscription ID (or charging ID), usage data record), and the PCRF 230 sends the SNES 210 an event notification (sponsored ID, subscription information ID, usage data record) at step 1419. If the event notification is received, the SNES 210 sends the PCRF 230 an ACK message at step 1421, and the PCRF 230 sends the PGW 240 an ACK message at step 1423.

Afterward, the SNES 210 notifies the mobile OS 130 of the UE of the expiry of the sponsored charge (deactivation notification (deactivation message, consumed sponsored data usage)) at step 1425. Then the mobile OS 130 of the UE sends the SNES 210 an ACK at step 1427. The OS also sends the content application 120 the received alert, the content application 120 processes this (Call the listener API if it was registered (for example deactivated sponsored Charging), and the user 110 displays the alert to the user at step 1129.

Figure 15:
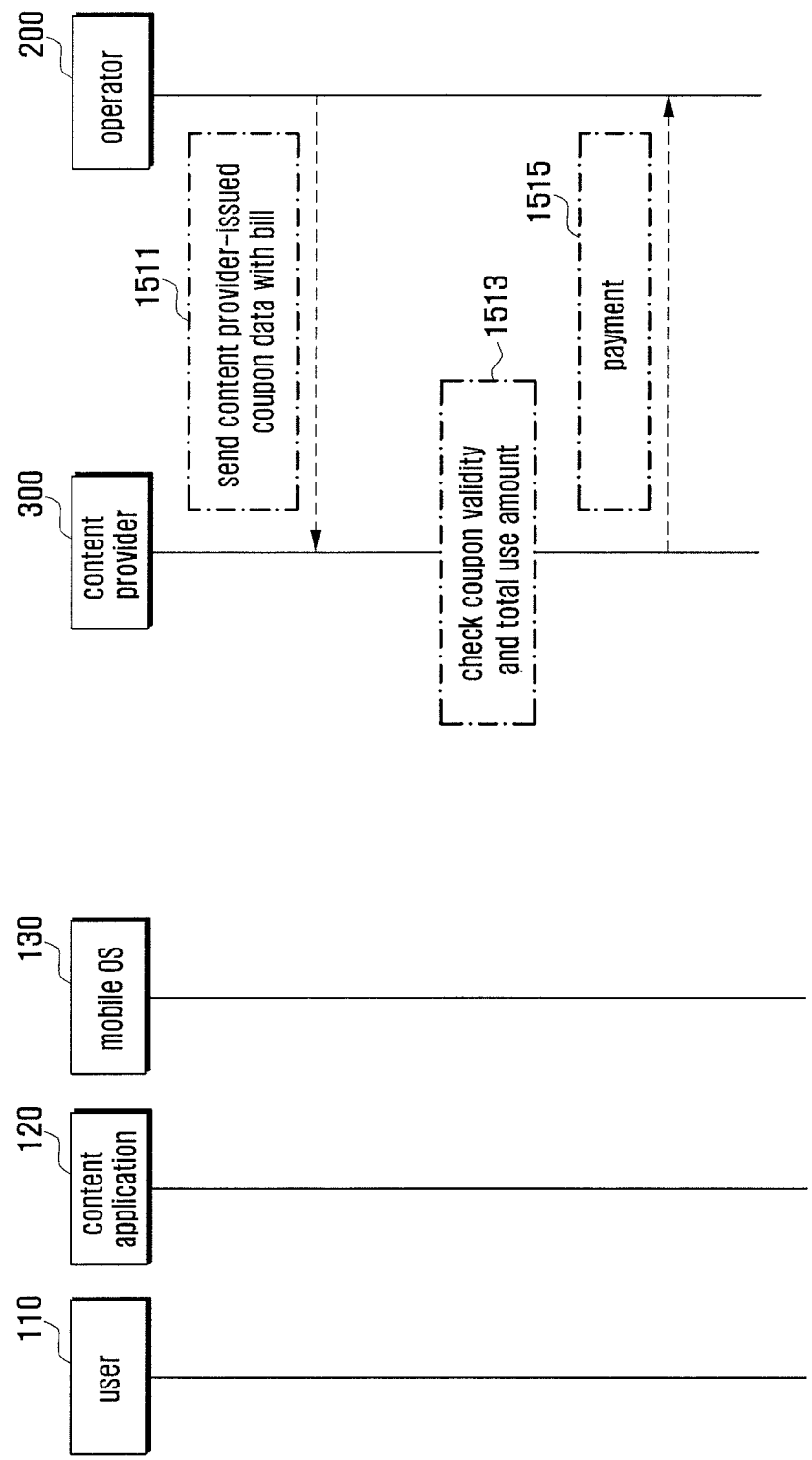
FIG. 15 is a diagram illustrating a charging procedure between the network operator and the service provider according to an embodiment of the present invention.

After the deactivation of the sponsored charge, the operator 200 charges for the sponsor traffic. FIG. 15 is a diagram illustrating a procedure of charging for the sponsored traffic after the end of the sponsored charge.

Referring to FIG. 15, if the sponsored charge is terminated, the operator sends the content provider 300 the provider-issued coupon data to the content provider along with the bill at step 1511. Then the content provider 300 verifies the validity of the coupon at step 1513 and, if the validity is verified, pays for the sponsor traffic consumed by the UE at step 1515.

FIG. 16 is a diagram illustrating the sponsor traffic processing procedure according to the second embodiment of the present invention.

Referring to FIG. 16, the third party provider (service provider or content provider) 300 and the operator 200 first perform pre-processing operation for processing the sponsor coupon. That is, the operator 200 offers the sponsor service to the service provider 300 intending to start a third party service. The third party provider 300 subscribes to the sponsor service offered by the operator 200. The service provider 300 sends the operator the public key (sponsor coupon service subscription information+public key) for use in transmitting messages to the operator and verifying validity at step 1611. The operator 200 sends the address of the server of the operator to which the third party accesses (operator server address) and the protocol set used at the server. Through this procedure, the service provider 300 and the operator 200 prepare for processing the sponsor traffic.

In the above state, the UE 100 may request for the sponsor traffic-based service (e.g. download button click after payment for ebook) at step 1621. At this time, the current operator id is transmitted along with the sponsor traffic request. Then the service provider 300 recognizes the sponsor traffic request and issues a coupon at step 1623. The coupon may be formatted as shown in table 2 and include a ID (e.g. phone number) for the operator to identify the UE and the address of the UE sponsored (IP address and port). Afterward, the service provider 300 sends the issued coupon to the server address received from the operator at step 1613 using the protocol set received at step 1613.

TABLE 2

Issuer ID: Content Provider ID ( Sponsor ID)
−Applied network : Operator ID
−Applied User : User ID ( MSISDN or private ID assigned by the operator )
 − Coupon ID: Serial Coupon Number
 − Usage Model: one of {total amount, total duration, until signaling the end }
 − Usage Model Parameters includes at least one of followings
 + Total amount: 300 MB if Usage Model is
 + Total duration: n hours, n days or n months
 + Until signaling the end
 − Sponsor Service Server : List IP address/Port and/or URL of the Server
 − Client address/port
 − Time Stamp
 Singed By the Issuer If the coupon is received, the operator 200 verifies the validity of the coupon, at step 1627, using the public key of the service provider 300 which has been received at step 1611. The operator 200 also configures the sponsor traffic filter using the server information contained in the coupon and generates a charging rule for charging the filtered traffic with the sponsor id at step 1627. At this time, the operator 200 establishes a new bearer, if necessary, and configures a filter and charging rule for the newly established bearer. The operations of coupon validity verification, filter installation, and charging rule configuration are performed in the procedure of FIG. 10.

After performing step 1627, the operator notifies the service provider 300 of the filter installation and coupon validation result at step 1629. Then the service provider 300 responds to the UE which has requested for the service purchase at step 1631 and notifies the UE of the server address (download server info.) included in the coupon issued at step 1623 as shown in table 2. Then the UE 100 requests for the service with the server address received at step 1631 to receive the sponsor traffic service at step 1633. At this time, payment for the sponsor traffic is recorded as a billing record associated with the subscription information identified by the sponsored ID but not being charged to the UE.

As described above, the UE is capable of receiving the expiry alert information through one of the methods described with reference to FIGS. 11 to 13 according to the usage model of the coupon in the state that the UE connected to the server of the service provider 300 through a mobile communication network is downloading the intended data. If the sponsor traffic service ends, the sponsored charge deactivation is performed through the procedure of FIG. 14, and the charge for the sponsor traffic is performed through the procedure of FIG. 15.

The sponsor traffic processing procedure according to the second embodiment of the present invention is performed as shown in FIG. 16 and is identical with that the first embodiment of the present invention in all aspects with the exception that the SNE communication client module of the mobile platform of the UE 100 exists in the SNE client program of the third party.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A billing control method of a mobile communication system, the method comprising:
   issuing, at a service provider when a sponsor service request is received from a terminal, a sponsor coupon to the terminal;
   transmitting the sponsor coupon from the terminal to an operator;
   transmitting, at the operator, a filter and charging rule for sponsor traffic configured based on the service coupon to the terminal;
   re-requesting, at the terminal, the service provider for the sponsor service to receive sponsor traffic service from the service provider; and
   charging, at the operator, the service provider for the sponsor traffic.

2. The method of claim 1, further comprising subscribing, at the service provider, to the service coupon service offered by the operator before receiving the sponsor service request.

3. The method of claim 2, wherein subscribing comprises exchanging information for use in verifying validity of the sponsor coupon between the service provider and the operator.

4. The method of claim 1, wherein the sponsor coupon comprises at least one of an operator identifier, a sponsor coupon identifier, a usage model, an access address of the service provider, and a usage start time of the sponsor coupon.

5. The method of claim 1, wherein re-requesting comprises:
   transmitting, at the terminal, a sponsor charge activation request message to the operator;
   configuring, at the operator, a charging rule to charge the service provider for the sponsor traffic;
   transmitting the charging rule to PGW (Packet Data Network Gateway) via PCRF (Policy Charging Rule Function); and
   installing, at the PGW, the charging rule and transmitting a response message to the operator.

6. A billing control apparatus of a mobile communication system, the apparatus comprising:
   a terminal which transmits a sponsor service request for use of a sponsor service to a service provider and transmits, when a sponsor coupon is received from the service provider, a sponsor service re-request to an operator;
   a service provider which issues, when the sponsor service request is received from the terminal, the sponsor coupon to the terminal, and provides, when a sponsor service re-request is received from the terminal, the user with the sponsor traffic service; and
   an operator which configures, when the sponsor coupon is received from the terminal, a filter and charging rule for the sponsor traffic using the received sponsor coupon, notifies the terminal of the configuration, and charges the service provider for the sponsor traffic.

7. The apparatus of claim 6, wherein the service provider subscribes to the sponsor coupon service offered by the operator.

8. The apparatus of claim 7, wherein the service provider exchanges information for use in verifying validity of the sponsor coupon with the operator in subscribing to the sponsor coupon service.

9. The apparatus of claim 6, wherein the sponsor coupon comprises at least one of an operator identifier, a sponsor coupon identifier, a usage model, an access address of the service provider, and a usage start time of the sponsor coupon.

10. The apparatus of claim 6, wherein the operator configures, when a sponsor charge activation request message is received from the terminal, a charging rule to charge the service provider for the sponsor traffic.

11. The apparatus of claim 10, wherein the operator transmits the charging rule to PGW (Packet Data Network Gateway) via PCRF (Policy Charging Rule Function).

* * * * *